(12) United States Patent
Izawa et al.

(10) Patent No.: US 6,516,628 B2
(45) Date of Patent: Feb. 11, 2003

(54) REFRIGERANT CYCLE SYSTEM WITH HOT-GAS BYPASS STRUCTURE

(75) Inventors: Satoshi Izawa, Anjo (JP); Yoshiaki Takano, Kosai (JP); Mikiharu Kuwahara, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/894,573

(22) Filed: Jun. 28, 2001

(65) Prior Publication Data

US 2002/0002841 A1 Jan. 10, 2002

(30) Foreign Application Priority Data

Jul. 6, 2000 (JP) ........................................ 2000-205530
May 18, 2001 (JP) ........................................ 2001-149707

(51) Int. Cl.[7] ........................... F25B 39/04; F25B 43/00; F25B 13/00
(52) U.S. Cl. ........................... 62/509; 62/512; 62/324.6
(58) Field of Search ........................... 62/509, 503, 512, 62/324.1, 324.6, 244

(56) References Cited

U.S. PATENT DOCUMENTS

| | | | |
|---|---|---|---|
| 5,146,767 A | * | 9/1992 | Kadle et al. ............... 62/474 |
| 5,265,443 A | * | 11/1993 | Yuzawa et al. ............. 62/498 |
| 5,291,941 A | | 3/1994 | Enomoto et al. |
| 5,309,731 A | * | 5/1994 | Nonoyama et al. .......... 62/244 |
| 5,813,249 A | * | 9/1998 | Matsuo et al. .............. 62/509 |
| 6,182,744 B1 | * | 2/2001 | Nakamura et al. .......... 165/140 |
| 6,267,173 B1 | * | 7/2001 | Hu et al. .................... 165/132 |

FOREIGN PATENT DOCUMENTS

EP  0894651 A  * 2/1999

* cited by examiner

*Primary Examiner*—William C. Doerrler
(74) *Attorney, Agent, or Firm*—Harness, Dickey & Pierce, PLC (57) ABSTRACT

In a refrigerant cycle system, a low-pressure side gas-liquid separator is disposed between a refrigerant outlet side of an evaporator and a refrigerant suction side of a compressor so that gas refrigerant is sucked into the compressor, and a throttle passage through which liquid refrigerant is introduced into the compressor is disposed in the low-pressure side gas-liquid separator. Further, in a condenser for condensing gas refrigerant discharged from the compressor in a cooling mode, both first and second heat-exchanging units are provided in this order in a refrigerant flow direction, and a high-pressure side gas-liquid separator is disposed between the first and second heat-exchanging units.

25 Claims, 8 Drawing Sheets

REFRIGERANT CYCLE SYSTEM WITH HOT-GAS BYPASS STRUCTURE

CROSS-REFERENCE TO RELATED APPLICATION

This application is related to Japanese Patent Applications No. 2000-205530 filed on Jul. 6, 2000, and No. 2001-149707 filed on May 18, 2001, the contents of which are hereby incorporated by reference.

BACKGROUND OF THE INVENTION

1. Field of the Invention

The present invention relates to a refrigerant cycle system for a vehicle, having a hot-gas bypass structure for directly introducing hot gas discharged from a compressor into an evaporator while bypassing a condenser. When the hot-gas refrigerant discharged from the compressor is directly introduced into the evaporator while bypassing the condenser, the evaporator is used as a radiator.

2. Description of Related Art

Figure 9:
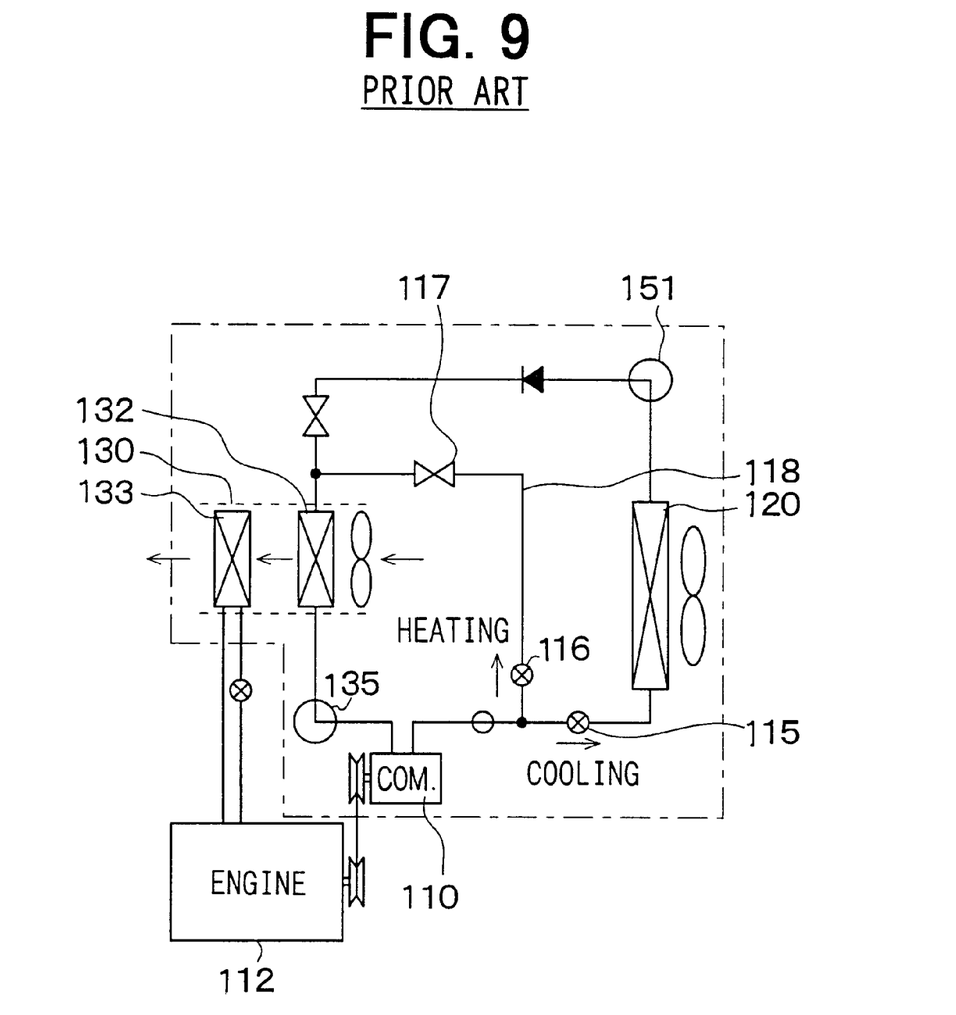
FIG. 9 is a schematic view showing a conventional refrigerant cycle system.

In a conventional refrigerant cycle system described in U.S. Pat. No. 5,291,941, a hot-gas bypass passage 118, through which refrigerant discharged from a compressor 110 is directly introduced into an evaporator 132 while bypassing a condenser 120, is provided, and a decompression unit 117 is disposed in the bypass passage 118. Further, in an air conditioning unit 130, a heater core 133 is disposed at a downstream air side of the evaporator 132. When temperature of engine-cooling water from an engine 112 is lower than a predetermined temperature in a heating mode, an electromagnetic valve 115 is closed and an electromagnetic valve 116 is opened, so that high-temperature gas refrigerant discharged from the compressor 110 flows into the evaporator 132 through the hot-gas bypass passage 118.

Further, a receiver 151 is disposed at a downstream side of the condenser 120, for separating refrigerant after passing through the condenser 20 into gas refrigerant and liquid refrigerant, and for storing surplus liquid refrigerant therein. On the other hand, an accumulator 135 is disposed between an outlet side of the evaporator 132 and a suction side of the compressor 110 so that separated gas refrigerant is sucked into the compressor 110.

However, in the conventional system, when a throttle diameter of a throttle passage for returning oil is made larger in the accumulator 135 for improving heating capacity in the heating mode, liquid refrigerant amount sucked into the compressor 110 in a cooling mode is increased, and cooling capacity is decreased in the cooling mode. That is, it is difficult to improve both the cooling capacity and the heating capacity.

In addition, in the conventional system, the hot-gas bypass passage 118 extends from a refrigerant discharge side of the compressor 110 in an engine compartment to a refrigerant inlet side of the evaporator 132 in a passenger compartment, and becomes longer. Therefore, a refrigerant pipe structure becomes complex, and it is difficult for the refrigerant cycle system to be mounted on a small space of a vehicle.

SUMMARY OF THE INVENTION

In view of the foregoing problems, it is an object of the present invention to provide a refrigerant cycle system having a hot-gas bypass structure, which improves both heating capacity in a heating mode and cooling capacity in a cooling mode.

It is an another object of the present invention to provide a refrigerant cycle system in which a size of a first gas-liquid separator provided in a low-pressure side can be reduced.

It is a further another object of the present invention to provide a refrigerant cycle system for a vehicle, in which a refrigerant pipe structure can be made simple and mounting performance on the vehicle can be improved.

According to the present invention, in a refrigerant cycle system where a heating mode and a cooling mode can be selectively switched in a heat exchanger, a first gas-liquid separator for separating refrigerant into gas refrigerant and liquid refrigerant and for introducing gas refrigerant into a compressor is disposed between a refrigerant outlet side of the heat exchanger and a refrigerant suction side of the compressor, and the first gas-liquid separator has a throttle passage for introducing a part of liquid refrigerant stored in the first gas-liquid separator into the compressor. Further, the condenser includes both first and second heat-exchanging units which are disposed in this order in a refrigerant flow direction, and a second gas-liquid separator disposed between the first heat-exchanging unit and the second heat-exchanging unit for separating refrigerant into gas refrigerant and liquid refrigerant. Because gas refrigerant within the second gas-liquid separator is changed on a saturated gas line of a Mollier diagram, a super-heating state of the refrigerant discharged from the compressor is determined by a heat-exchanging amount of the first heat-exchanging unit. In addition, because a compression process of refrigerant in the compressor is basically an isoentropic change due to adiabatic compression, a super-heating degree of refrigerant at the outlet of the heat exchanger can be controlled to a suitable value by suitably setting the heat-exchanging amount of the first heat-exchanging unit. Accordingly, in the cooling mode, the super-heating state of refrigerant at the outlet side of the heat exchanger can be forcibly set at a suitable super-heating degree by controlling the heat-exchanging amount of the first heat-exchanging unit. Therefore, in the cooling mode, even when a throttle opening degree of the throttle passage of the first gas-liquid separator is made larger, it can prevent liquid refrigerant amount sucked into the compressor from being increased. As a result, the throttle opening degree of the throttle passage can be made larger. In this case, in the heating mode, compression operation amount can be increased, and the heating capacity in the heating mode can be improved without reducing the cooling capacity. Accordingly, in the refrigerant cycle system, it is possible to improve both the heating capacity and the cooling capacity.

Further, because the second gas-liquid separator is also disposed between the first and second heat-exchanging units, a tank volume of the first gas-liquid separator can be made smaller. In the cooling mode, the first gas-liquid separator can be used only as a refrigerant passage where super-heating gas refrigerant from the heat exchanger flows. Only in the heating mode, the first gas-liquid separator has a gas-liquid separation function. Therefore, the size of the first gas-liquid separator can be greatly reduced, and mounting performance of the first and second gas-liquid separators on the-vehicle can be improved.

Preferably, the first heat-exchanging unit is disposed to cool and condense refrigerant discharged from the compressor, the second gas-liquid separator is disposed for separating refrigerant from the first heat-exchanging unit into gas refrigerant and liquid refrigerant and for introducing separated gas refrigerant into the second heat-exchanging unit, the second heat-exchanging unit is disposed for condensing gas refrigerant from the second gas-liquid separator, and a super-heating degree of refrigerant at a refrigerant outlet of the heat exchanger is controlled by the heat-exchanging amount in the first heat-exchanging unit. Therefore, in the cooling mode, the super heating degree of refrigerant at the refrigerant outlet of the heat exchanger can be suitably controlled.

Preferably, the first heat-exchanging unit and the second heat-exchanging unit are integrally constructed as an integrated member, and the second gas-liquid separator is constructed integrally with both the first and second heat-exchanging units. Therefore, the integrated condenser can be readily mounted on the vehicle.

Further, the first decompression unit is disposed at a position proximate to the condenser, a refrigerant outlet side of the first decompression unit and a refrigerant outlet side of the hot-gas bypass passage are joined to a single refrigerant pipe at a position proximate to the condenser, and the single refrigerant pipe is connected to a refrigerant inlet side of the heat exchanger. Therefore, a refrigerant pipe structure of the refrigerant cycle system can be made simple, and the refrigerant cycle system can be readily mounted on the vehicle.

On the other hand, in a refrigerant cycle system according to the present invention, a first gas-liquid separator for separating refrigerant into gas refrigerant and liquid refrigerant and for introducing gas refrigerant into a compressor is disposed between a refrigerant outlet side of a heat exchanger and a refrigerant suction side of a compressor, a second gas-liquid separator for separating refrigerant into gas refrigerant and liquid refrigerant is disposed in a branched refrigerant passage branched from a main refrigerant passage of a condenser, the first gas-liquid separator has a throttle passage for introducing a part of liquid refrigerant stored in the first gas-liquid separator into the compressor, and the second gas-liquid separator is disposed in such a manner that a liquid refrigerant amount stored in the second gas-liquid separator is adjusted in accordance with a super-heating degree of gas refrigerant discharged from the compressor. Therefore, the liquid refrigerant amount in the second gas-liquid separator can be adjusted in accordance with the super-heating degree of refrigerant discharged from the compressor, and the supper-heating degree of refrigerant at the refrigerant outlet side of the heat exchanger and the super heating degree of refrigerant discharged from the compressor can be adjusted. Accordingly, it can prevent a refrigerant amount circulating in the refrigerant cycle system from being insufficient, and a sufficient cooling capacity can be provided in the cooling mode. Further, because only a part of refrigerant in the condenser is introduced into the second gas-liquid separator while being branched from the main refrigerant passage of the condenser, a refrigerant-recovering operation can be effectively performed in a short time in the heating mode.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
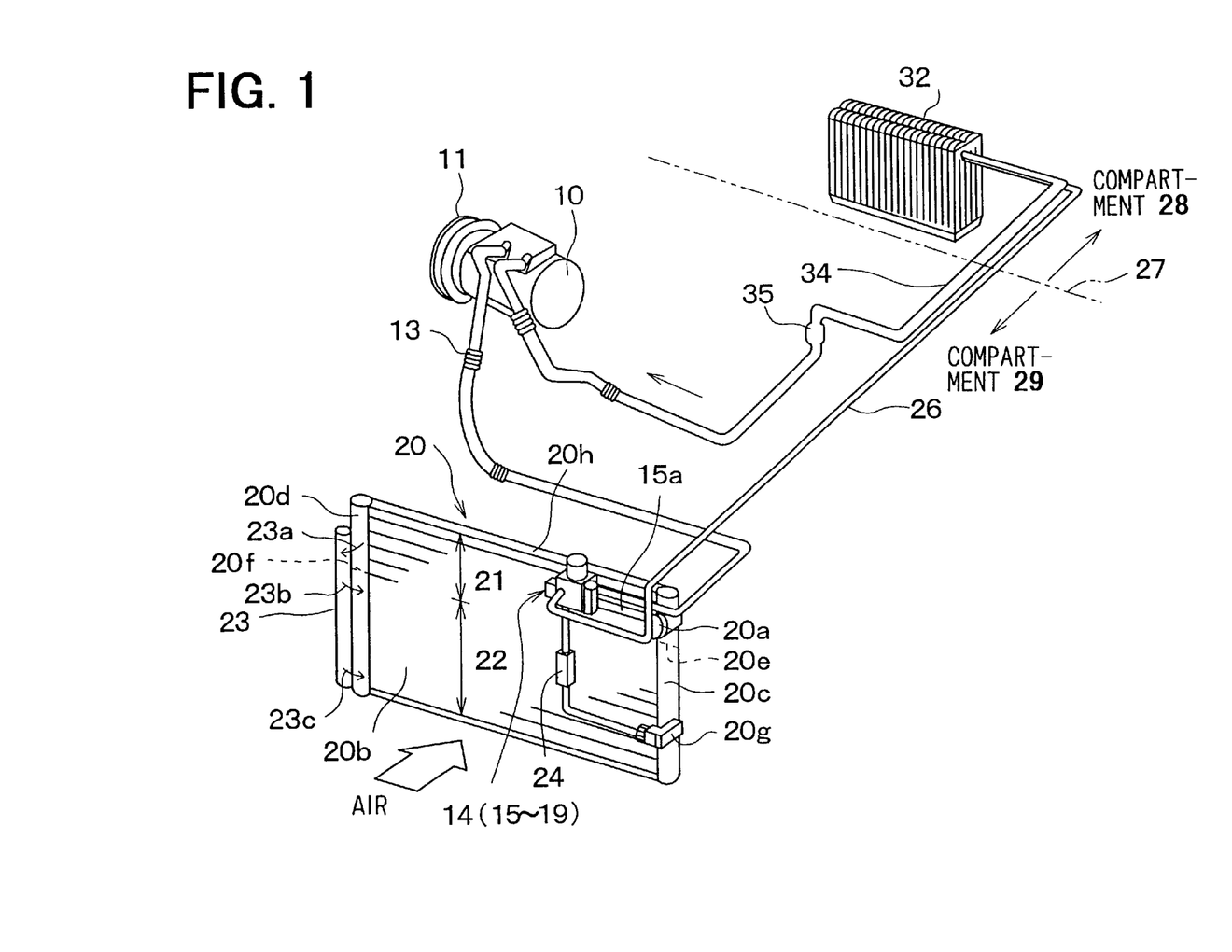
FIG. 1 is a schematic perspective view showing a mounting state of a refrigerant cycle system on a vehicle, according to a first preferred embodiment of the present invention.
Figure 2:
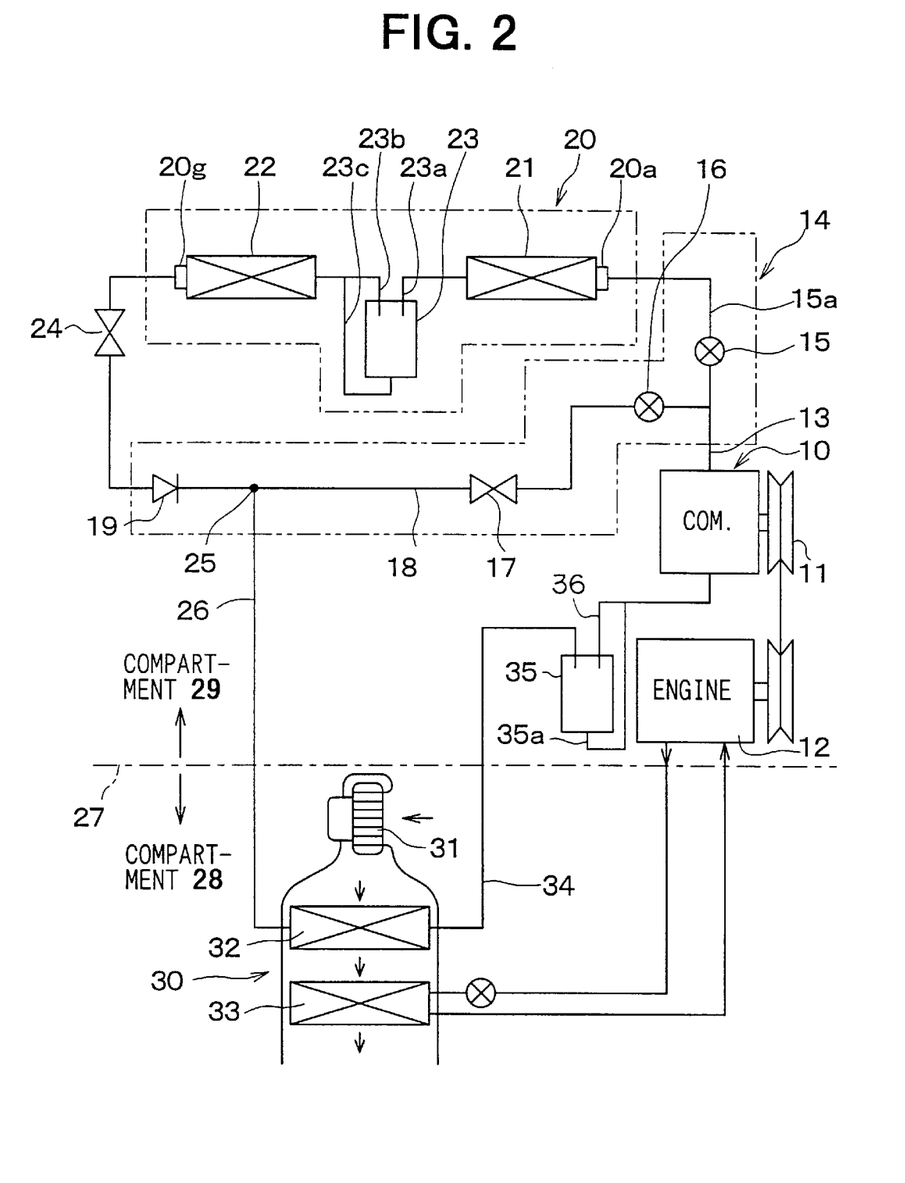
FIG. 2 is a view for explaining a cycle operation in the refrigerant cycle system according to the first embodiment.
Figure 3:
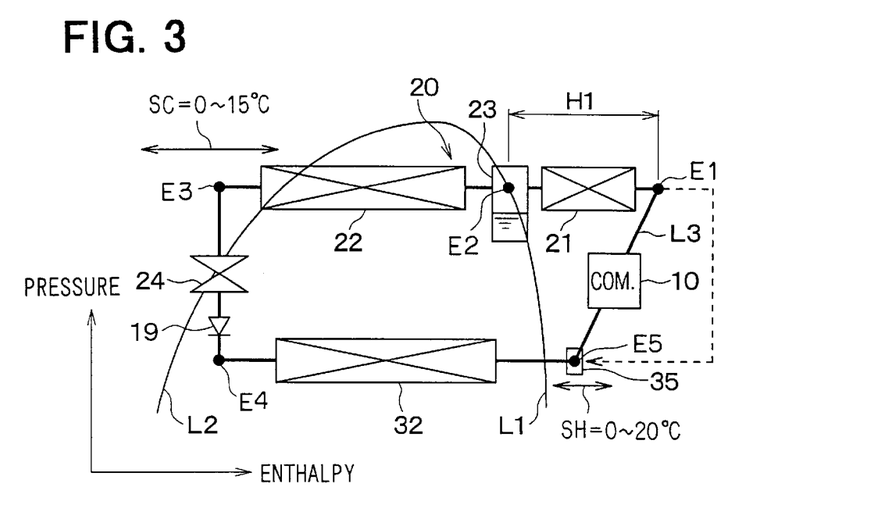
FIG. 3 is a Mollier diagram for explaining a cycle operation in a cooling mode, according to the first embodiment.

A first preferred embodiment of the present invention will be now described with reference to FIGS. 1–3. As shown in FIGS. 1 and 2, a compressor 10 is driven by a vehicle engine 12 through an electromagnetic clutch 11. A valve device 14 is disposed at a side of a discharge pipe 13 through which refrigerant discharged from the compressor 10 flows. As shown in FIG. 2, the valve device 14 includes an electromagnetic valve 15 for cooling, an electromagnetic valve 16 for heating, a decompression unit 17 for heating, a hot-gas bypass passage 18 and a check valve 19. The electromagnetic valve 16 and the decompression unit 17 are disposed in the hot-gas bypass passage 18. Accordingly, the decompression unit 17 can be constructed by a fine-radial throttle hole (fixed throttle) provided at a refrigerant outlet of the electromagnetic valve 16.

The discharge pipe 13 of the compressor 10 is connected to an inlet joint 20a of a condenser 20, and the electromagnetic valve 15 is disposed in the discharge pipe 13 at an upstream side of the condenser 20 in a refrigerant flow direction. High-pressure gas refrigerant discharged from the compressor 10 flows into the condenser 20 after passing through the electromagnetic valve 15, and heat-exchanges with outside air to be cooled and condensed in the condenser 20. As shown in FIGS. 1 and 2, the condenser 20 has a first heat-exchanging unit 21 and a second heat-exchanging unit 22 which are provided in this order in a refrigerant flowing direction. A gas-liquid separator 23 (second gas-liquid separator) for separating refrigerant into gas refrigerant and liquid refrigerant is disposed between the first heat-exchanging unit 21 and the second heat-exchanging unit 22 in the condenser 20.

The condenser structure indicated in FIG. 1 shows a specific example of the condenser 20 in which the first heat-exchanging unit 21, the second heat-exchanging unit 22 and the gas-liquid separator 23 are integrated. That is, the condenser 20 is a separator-integrated condenser. In FIG. 1, the condenser 20 includes a heat-exchanging portion 20b in which plural tubes through which refrigerant flows and plural corrugated fins are alternatively laminated in an up-down direction. Both header tanks 20c, 20d are disposed to extend vertically at both ends of each tube.

A partition member 20e for partitioning an inner space within the one header tank 20c is disposed so that the inner space of the one header tank 20c is partitioned into up and lower spaces. Accordingly, refrigerant from the inlet joint 20a passes through upper side tubes of the heat-exchanging portion 20b after passing through the upper space of the one header tank 20c. A partition plate 20f is disposed within an inner space of the other header tank 20d so that the inner space of the other header tank 20d is partitioned into upper and lower spaces. Accordingly, refrigerant passing through the upper side tubes of the heat-exchanging portion 20b passes through the upper space of the other header tank 20d, and flows into an upper portion of the gas-liquid separator 23 from a first communication path 23a through which the upper space of the other header tank 20d communicates with the upper portion of the gas-liquid separator 23.

The gas-liquid separator 23 has a long and narrow tank shape extending in a vertical direction (up-down direction), and separates refrigerant into gas refrigerant and liquid refrigerant through the use of a difference in density between liquid refrigerant and gas refrigerant. The gas-liquid separator 23 is integrated with the other header tank 20d, and has a tank accumulating liquid refrigerant in the lower part of the tank. Gas refrigerant separated in the gas-liquid separator 23 flows into the lower space of the other header tank 20d under the partition plate 20f through a second communication path 23b provided at an upper side of the gas-liquid separator 23 between the gas-liquid separator 23 and the other header tank 20d. Gas refrigerant flowing into the lower space of the other header tank 20d flows through the lower side tubes of the heat-exchanging portion 20b, flows into the lower space of the one header tank 20 under the partition plate 20e, and thereafter, flows to an outside of the condenser 20 from an outlet joint 20g.

At a lowest side of the gas-liquid separator 23, a third communication path 23c is provided so that oil contained in liquid refrigerant can be returned. The third communication path 23c is constructed by a throttle passage. A part of liquid refrigerant containing oil, within the gas-liquid separator 23, flows into the lower space of the other header tank 20d through the third communication path 23c.

In the first embodiment, the first heat-exchanging unit 21 is constructed in the upper side part of the heat-exchanging portion 20b, and the second heat-exchanging unit 22 is constructed in the lower side part of the heat-exchanging portion 20b. In FIG. 1, for simply indicating the refrigerant flow, the refrigerant flow is indicated in a simple straight line. However, refrigerant may flow meanderingly in the first and second heat-exchanging units 21, 22 of the condenser 20 to be U-turned in at least one of both the header tanks 20c, 20d.

The condenser 20 according to the first embodiment is formed by integrally assembling the first heat-exchanging unit 21, the second heat-exchanging unit 22 and the gas-liquid separator 23 to assemble these three parts into single-piece integrated structure by an aluminum integral brazing method or the like. However, even if these three parts of the first heat-exchanging unit 21, the second heat-exchanging unit 22 and the gas-liquid separator 23 are constructed individually and these three parts are coupled through the use of appropriate piping or the like, the same functions are provided.

Further, in the first embodiment, the valve device 14, the inlet joint 20a and the outlet joint 20g are disposed at an upstream air side in the condenser 20 in an air-flowing direction. The inlet joint 20a and the outlet joint 20g are fixed to the one header tank 20c away from each other in the up-down direction. In addition, for example, an outlet portion 15a of the electromagnetic valve 15 of the valve device 14 can be fixed to the inlet joint 20a so that an entire body of the valve device 14 is supported in and fixed to the joint portion 20a of the condenser 20. Here, the valve device 14 may be fixed to an upper side plate 20h of the condenser 20 through a suitable bracket.

A decompression unit 24 (first decompressing unit) is coupled to the outlet joint 20g, so that refrigerant after passing through the condenser 20 is decompressed in the decompression unit 24 to become gas-liquid two-phase refrigerant. For example, the decompression unit 24 may be formed by a capillary tube having a fine diameter (e.g., $\phi=1.2$–$1.3$ mm) and a predetermined length.

The check valve 19 within the valve device 14 is connected to an outlet side of the decompression unit 24. The check valve 19 is disposed to prevent a refrigerant flow from the hot-gas bypass passage 18 toward the condenser 20 in a heating mode. An outlet portion of the check valve 19 is joined to an outlet portion of the hot-gas bypass passage 18 within the valve device 14. Accordingly, the hot-gas bypass passage 18 can be constructed by a very short passage provided within the valve device 14 at a position proximate to the condenser 20, and a joint portion 25 at which the outlet portion of the hot-gas bypass passage 18 and the outlet portion of the check valve 19 are joined can be provided within the valve device 14.

As shown in FIG. 2, a single low-pressure refrigerant pipe 26 is connected to the joint portion 25, and extends from an engine compartment 29 into a passenger compartment 28 through a hole of a dashboard 27. The dashboard 17 is for partitioning the engine compartment 29 and the passenger compartment 28 from each other.

An air conditioning unit 30 is disposed in the passenger compartment 28 at a front side under an instrument panel. In the air conditioning unit 30, an evaporator 32 (heat exchanger) for cooling air in the cooling mode is disposed at a downstream air side of an electrical blower unit 31 for blowing air, a hot-water type heater core 33 is disposed at a downstream air side of the evaporator 32. The low-pressure refrigerant pipe 26 connected to the joint portion 25 is connected to a refrigerant inlet of the evaporator 32, and a refrigerant outlet of the evaporator 32 is connected to a low-pressure refrigerant pipe 34. The low-pressure refrigerant pipe 34 connected to the refrigerant outlet of the evaporator 32 extends toward the engine compartment 29 after penetrating through the dashboard 27, and is connected to an inlet of an accumulator 35 (first gas-liquid separator). Gas refrigerant separated in the accumulator 35 is sucked into a suction port of the compressor 10 through a suction pipe 36.

The accumulator 35 is a low-pressure side gas-liquid separator in which low-pressure refrigerant discharged from the evaporator 32 is separated into gas refrigerant and liquid refrigerant, and liquid refrigerant is stored in the accumulator 35 in the heating mode. A throttle passage 35a (oil-returning passage) from which liquid refrigerant containing oil can be sucked into the compressor 10 is provided at a bottom side of the accumulator 35 to be connected to the suction pipe 36.

The throttle passage 35a for returning oil can be formed into a structure similar to the third communication path 23c. In FIG. 2, the throttle passage 35a is simply independently indicated. However, the throttle passage 35a for returning oil can be formed in the accumulator 35 adjacent to the bottom portion, and can be formed into the other shape.

The accumulator 35 can be used by combining with the high-pressure side gas-liquid separator 23. In this case, the size can be greatly reduced. The accumulator 35 can connected to the low-pressure side refrigerant pipe 34 of the evaporator 32 to be supported by the low-pressure side refrigerant pipe 34 as shown in FIG. 1.

In the cooling mode or a dehumidifying mode, refrigerant in the evaporator 32 absorbs heat from air blown by the blower 31, so that air passing through the evaporator 32 is cooled and dehumidified. On the other hand, in a heating mode in the winter, high-temperature gas refrigerant (hot gas) flowing through the hot-gas bypass passage 18 flows into the evaporator 32 (heat exchanger) so that air passing through the evaporator 32 is heated. In this case, the evaporator 32 is used as a radiator.

Hot water (engine-cobling water) from the engine 12 flows into the heater core 33 by operation of a water pump, so that air passing through the heater core 33 is heated using hot water as a heating source. Thereafter, conditioned air is blown into the passenger compartment 28 from an air outlet provided at a downstream air side of the heater core 33.

Each operation of the electromagnetic clutch 11, the electromagnetic valve 15, the electromagnetic valve 16, a cooling fan for blowing air toward the condenser 20, the electrical blower 31 and the like of the refrigerant cycle system are controlled by an electronic control unit (not shown).

Next, operation of the refrigerant cycle system according to the first embodiment will be now described. When the cooling mode for cooling the passenger compartment 28 is selected, the electromagnetic valve 15 is opened and the electromagnetic valve 16 is closed. Further, the electromagnetic clutch 11 is turned on to be electrically connected, and the compressor 10 is driven by the engine 12. In this case, gas refrigerant discharged from the compressor 10 flows through the electromagnetic valve 15, the condenser 20, the decompression unit 24, the check valve 19, the evaporator 32 and the accumulator 35 in this order, and thereafter returns to the compressor 10. The operation in the cooling mode will be described in detail using a Mollier diagram shown in FIG. 3. That is, super-heating gas refrigerant E1 discharged from the compressor 10 flows into the first heat-exchanging unit 21 of the condenser 20 to perform a heat exchange with outside air to be cooled, and thereafter, flows into the high-pressure side gas-liquid separator 23.

In the refrigerant cycle system of the first embodiment, the gas-liquid separator 23 is set, so that liquid refrigerant is always stored therein, and a predetermined gas-liquid interface is provided therein. That is, when super-heating gas flows into the gas-liquid separator 23 from the first heat-exchanging unit 21, a part of liquid refrigerant stored in the gas-liquid separator 23 is evaporated. Conversely, when gas-liquid two-phase refrigerant flows from the first heat-exchanging unit 21 into the gas-liquid separator 23, gas-liquid refrigerant is separated from each other in the gas-liquid separator 23.

Because the gas-liquid interface is always formed in the gas-liquid separator 23, refrigerant E2 within the gas-liquid separator 23 is positioned on a saturated gas line L1 in the Mollier diagram, and the super-heating degree becomes zero (SH=0° C.). Thus, saturated gas refrigerant E2, which has been gas-liquid separated within the gas-liquid separator 23, flows into the second heat-exchanging unit 22 of the condenser 20, and heat-exchanges with cooling air (outside air) to be condensed.

The super-cooling degree SC of the refrigerant E3 at the outlet of the second heat-exchanging unit 22 is determined depending on fluctuations in the cycle operating conditions. More specifically, because the decompression unit 24 is constructed by a fixed restrictor, the super-cooling degree SC is determined depending on a flow-amount characteristic of the fixed restrictor, a cycle high pressure and a cycle refrigerant flow amount. The flow amount characteristic is determined based on a type of the fixed restrictor.

The above-described super-cooled refrigerant E3 is next decompressed by the fixed restrictor of the decompression unit 24 to become low-pressure gas-liquid refrigerant E4, this low-pressure refrigerant E4 next absorbs heat from air flowing through the evaporator 32 in the air conditioning unit 30 to be evaporated, and becomes overheated gas refrigerant E5 having a suitable super-heating degree SH. This overheated gas refrigerant E5 is sucked into the compressor 10 to be compressed again.

In the refrigerant cycle system of the first embodiment, refrigerant E2 within the gas-liquid separator 23 located midway in the condenser 23 is maintained in the saturated state on the saturated gas line L1 as described above. Therefore, gas refrigerant E1 discharged from the compressor 10 is set at an overheated state determined by a heat-exchange amount (i.e., amount of heat radiation) H1 in the first heat-exchanging unit 21 of the condenser 20. In other words, the state of the discharged gas refrigerant E1 is determined by an increase or a decrease of the heat exchange amount H1.

Because a compression process of refrigerant in the compressor 10 is basically with an isoentropic change due to adiabatic compression, when the state of the discharged gas refrigerant E1 is determined, the state of the refrigerant E5 at the suction-side of the compressor 1, that is, the super-heating degree SH of the refrigerant E5 is determined by an isoentropic line L3. Accordingly, even if the super-heating degree SH of the suction-side refrigerant E5 fluctuates depending on fluctuations in the cycle operating conditions, the heat exchange amount H1 of the first heat-exchanging unit 21 is suitably set in advance, so that it becomes possible to control the super-heating degree SH of the suction-side refrigerant E5 within a range of, for example, 0 to 20° C.

According to the first embodiment, the state of gas refrigerant E1 discharged from the compressor 10 is determined based on the heat exchange amount H1 of the first heat-exchanging portion 21, so that the super-heating degree SH of the suction refrigerant E5 is controlled. Therefore, even when the accumulator 35 is disposed at the suction side of the compressor 10, super-heating gas refrigerant having a suitable super-heating degree SH passes through the accumulator 35. Accordingly, in the cooling mode, the accumulator 35 only uses as a refrigerant passage, but not have a gas-liquid separation function.

On the other hand, in the heating mode in the winter, the electromagnetic valve 15 is closed and the electromagnetic valve 16 is opened by the electronic control unit, so that the hot-gas bypass passage 18 is opened. Accordingly, high-temperature gas refrigerant (super-heating gas refrigerant) discharged from the compressor 10 flows through the electromagnetic valve 16, and is decompressed in the decompression unit 17 (fixed throttle). Thereafter, the decompressed gas refrigerant is introduced into the evaporator 32 of the air conditioning unit 32 through the hot-gas bypass passage 18 and the low-pressure pipe 26. Accordingly, in the heating mode in the winter, air passing through the evaporator 32 is heated by the heat radiation of hot-gas refrigerant. Thereafter, refrigerant from the evaporator 32 flows into the accumulator 35, and is separated into gas refrigerant and liquid refrigerant in the accumulator 35. Gas refrigerant separated in the accumulator 35 is sucked into the compressor 10 to be compressed in the heating mode. Simultaneously, a little of liquid refrigerant (containing oil) stored in the lower side of the accumulator 35 is also sucked into the compressor 10 through the throttle passage 35a.

In the heating mode, the check valve 19 prevents refrigerant from flowing from the hot-gas bypass passage 18 toward the condenser 20. Therefore, in the heating mode, it can prevent refrigerant from staying within the condenser 20.

According to the first embodiment, both cooling capacity in the cooling mode and heating capacity in the heating mode can be improved. That is, the heating capacity due to the hot-gas heater is determined based on the compression operation amount of the compressor 10. Therefore, for improving the heating capacity, the throttle diameter (throttle opening degree) of the throttle passage 35a (liquid returning passage) is made larger (e.g., $\phi$ 2.5 degrees). In this case, the suction refrigerant amount is increased in the compressor 10, and the compression operation amount of the compressor 10 is increased. However, when the throttle diameter of the throttle passage 35a of the accumulator 35 is made larger, the suction liquid refrigerant amount to be sucked into the compressor 10 is also increased in the cooling mode in a general refrigerant cycle. In the cooling mode, if the liquid refrigerant amount sucked into the compressor 10 is increased, the refrigerant amount flowing through the evaporator 32 is increased, a refrigerant evaporation pressure (low-pressure side pressure) is increased, and refrigerant evaporation temperature is increased. As a result, temperature of air blown from the evaporator 32 is increased in the cooling mode, and cooling capacity is decreased in this general refrigerant cycle. Further, in this case, by increasing the liquid refrigerant amount sucked into the compressor 10, oil returning amount circulating in the refrigerant cycle is excessively increased. Accordingly heat exchange between refrigerant and air is deteriorated in the evaporator 32, and cooling capacity is further decreased. That is, for improving the cooling capacity in the cooling mode, the throttle degree (diameter) is preferable to be set lower than a predetermined degree ($\phi$ 1.2 degrees). Therefore, the throttle diameter (throttle opening degree) of the throttle passage 35a in the cooling mode and the throttle diameter (throttle opening degree) of the throttle passage 35a in the heating mode have an opposite relationship.

However, according to the first embodiment of the present invention, the condenser 20 is constructed so that the gas-liquid separator 23 is provided between the first and second heat-exchanging units 21, 22. In addition, in the cooling mode, the refrigerant cycle system is set, so that refrigerant to be sucked into the compressor 10 has a predetermined super-heating degree and the accumulator 35 is used as a refrigerant passage through which super-heating gas refrigerant passes. Accordingly, in the first embodiment, even the throttle diameter (i.e., throttle opening degree) of the throttle passage 35a is set larger for improving the heating capacity in the heating mode, it can prevent the cooling capacity in the cooling mode from being decreased because the accumulator 35 is only used as a refrigerant passage in the cooling mode.

Thus, according to the first embodiment, even when the throttle diameter (throttle sectional area) of the oil returning passage 35a is enlarged for improving the heating capacity in the heating mode, the cooling capacity in the cooling mode is not lowered. Accordingly, both the heating capacity and the cooling capacity can be improved.

In the first embodiment of the present invention, a variation in the refrigerant circulating amount due to a variation in the heat load in the cooling mode, can be absorbed by a tank volume of the high-pressure side gas-liquid separator 23 of the condenser 20. Therefore, the accumulator 35 does not need to set a tank size for absorbing the variation in the refrigerant circulating amount in the cooling mode. That is, the tank size of the accumulator 35 can be set only by considering a necessary refrigerant amount in the heating mode. Further, in the heating mode, the surplus refrigerant in the heating mode can be stored to be divided into the gas-liquid separator 23 of the condenser 2 and the accumulator 35. Accordingly, the tank size of the accumulator 35 can be greatly reduced as compared with a general accumulator cycle (e.g., by ⅓ or less). As shown in FIG. 1, the accumulator 35 is connected in the low-pressure pipe 34 at the refrigerant outlet side of the evaporator 32, and is supported only by the low-pressure pipe 34. Therefore, it is unnecessary to support and fix the accumulator 35 to a vehicle body through a special bracket. Thus, a mounting performance of the accumulator 35 onto the vehicle can be improved.

In addition, because the decompression unit 24 is constructed by a fixed throttle without having a temperature sensing portion, such as a capillary tube, an adjustment operation of the refrigerant flow amount is not hardly disturbed by a high heat from the vehicle engine 12 and hot air within the engine compartment 29. Therefore, the decompression unit 24 can be disposed within the engine compartment 29 at a position adjacent to the condenser 20.

As a result, at a position around the condenser 20, it is possible to join the outlet side of the decompression unit 24 and the outlet side of the hot-gas bypass passage 18 to the single low-pressure side pipe 26. Therefore, the hot-gas bypass passage 18 can be provided in the valve device 14 proximate to the condenser 20, and these refrigerant passage can be made shorter. Thus, only using both the low-pressure side pipes 26, 34 penetrating through the dashboard 27, the components of the refrigerant cycle system, provided in the engine compartment 29, can be connected to the evaporator 32 provided in the passenger compartment 28. Thereby, the hot-gas heating function can be obtained in the refrigerant cycle system, while pipe structure of the refrigerant cycle system can be made simple and the mounting performance of the refrigerant cycle system on the vehicle can be improved. In addition, the elements 15–19 of the valve 14 device are integrated without greatly changing the refrigerant pipe arrangement. Therefore, the refrigerant cycle system having the hot-gas heating function (hot-gas bypass structure) can be mounted on the vehicle only by adding the valve device 14 integrating those elements 15–19, and the mounting performance of the refrigerant cycle system on the vehicle can be further improved.

A second preferred embodiment of the preset invention will be now described with reference to FIG. 4. In the above-described first embodiment, the high-pressure side gas-liquid separator 23 is integrally constructed with the header tank 20d of the condenser 20. In the second embodiment, as shown in FIG. 4, the high-pressure side gas-liquid separator 23 is constructed to be separately from the condenser 20 having the first and second heat-exchanging units 21, 22.

Figure 4:
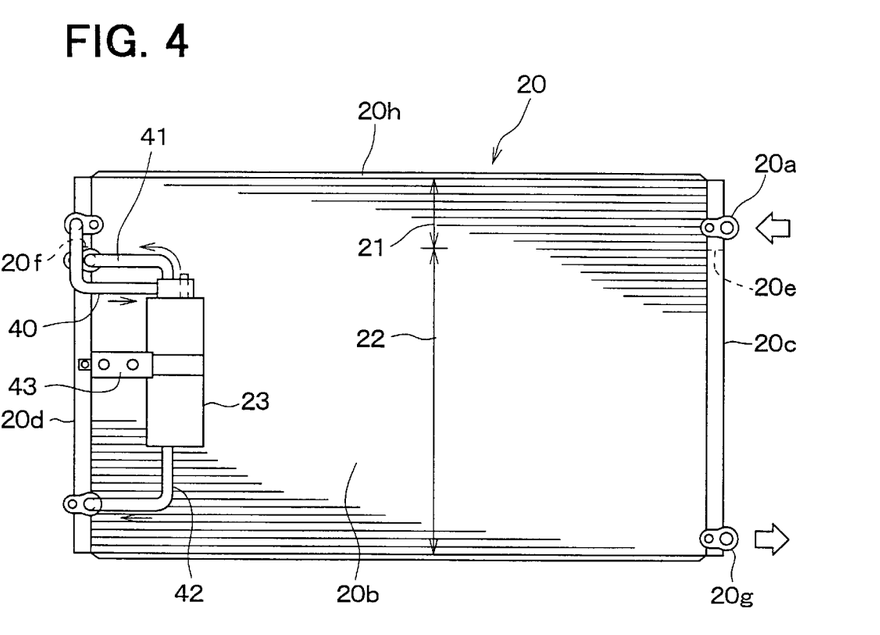
FIG. 4 is a front view of a condenser according to a second preferred embodiment of the present invention.

That is, in the second embodiment, as shown in FIG. 4, the high-pressure side gas-liquid separator 23 is constructed by a independent tank member separated from the header tank 20d of the condenser 20, and the gas-liquid separator 23 and the header tank 20d are connected by three pipes 40–42. The first pipe 40 is for introducing refrigerant in the upper space of the header tank 20d upper than the partition plate 20f into the gas-liquid separator 23. Accordingly, the first pipe 40 of the second embodiment corresponds to the first communication path 23a of the above-described first embodiment. The second pipe 41 is for introducing gas refrigerant from the upper side within the gas-liquid separator 23 into the lower space of the header tank 20d, lower than the partition plate 20f. Accordingly, the second pipe 41 of the second embodiment corresponds to the second communication path 23b of the above-described first embodiment. In addition, the third pipe 41 is for introducing liquid refrigerant containing oil, from the bottom side within the gas-liquid separator 23 into the lower space within the header tank 20d under the partition plate 20f. Accordingly, the third pipe 42 of the second embodiment corresponds to the third communication path 23c of the above-described first embodiment.

In the second embodiment, the gas-liquid separator 23 is supported in and is fixed to the header tank 20d through a bracket 43. However, in the second embodiment, the high-pressure side gas-liquid separator 23 may be fixed to the vehicle body around the condenser 20 through a bracket.

In the second embodiment, the other parts are similar to those of the above described first embodiment, and the effects similar to those of the above-described first embodiment can be obtained.

A third preferred embodiment of the present invention will be now described with reference to FIG. 5. In the above described first embodiment, the accumulator 35 is disposed to be held in the low-pressure side pipe 34 in the engine compartment 29. However, in the third embodiment, as shown in FIG. 5, the accumulator 34 is disposed in the low-pressure side pipe 34 within the passenger compartment 28.

Figure 5:
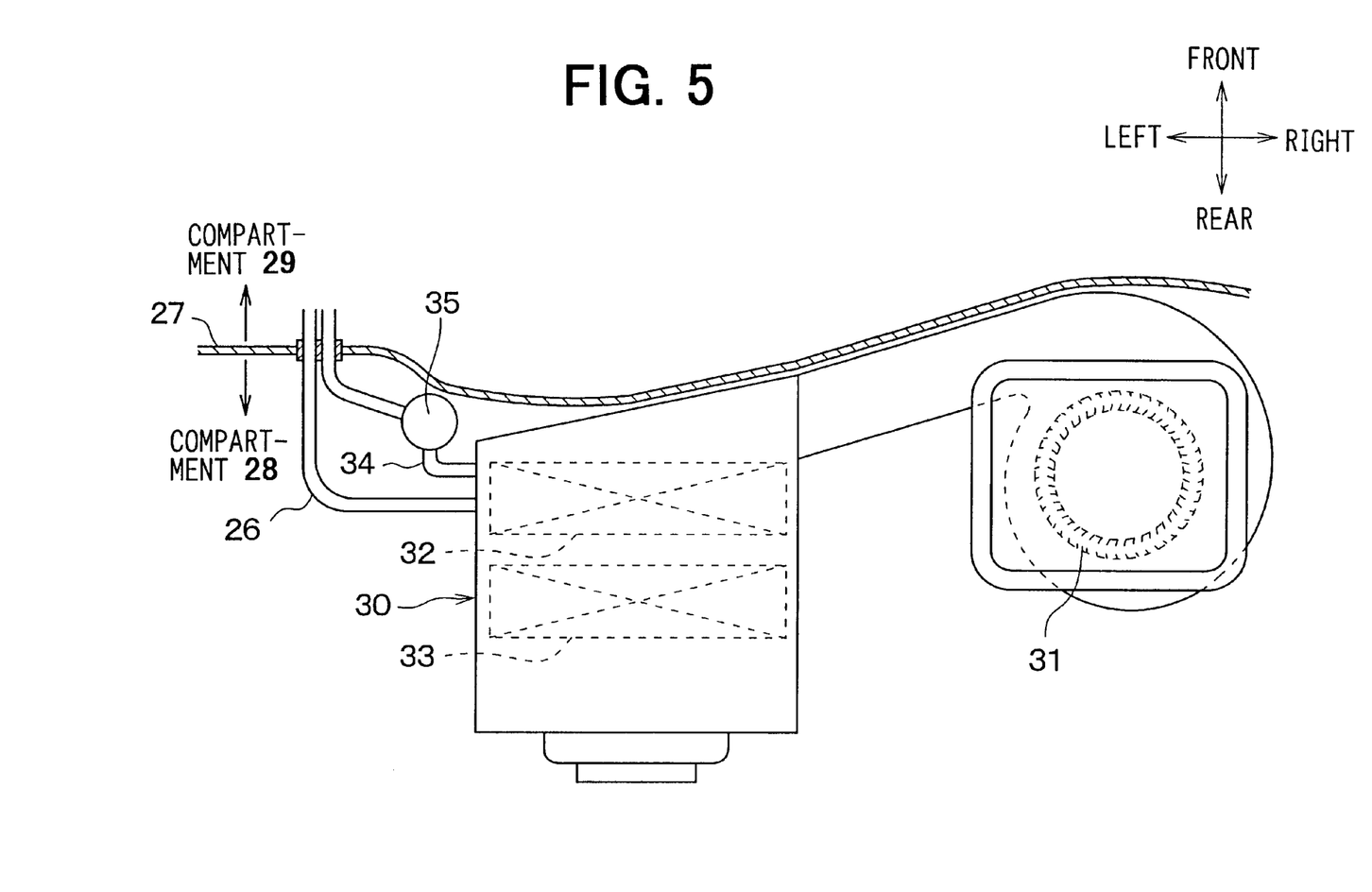
FIG. 5 is a schematic view showing a mounting state of an accumulator in a refrigerant cycle system according to a third preferred embodiment of the present invention.

FIG. 5 shows a mounting state of an air conditioner on a vehicle having a left steering wheel. In this case, the air conditioning unit 30 is disposed in the passenger compartment 28 at a vehicle front side under an instrument panel (not shown) at an approximate center in a vehicle right-left direction. On the other hand, the blower 31 is disposed at a vehicle front side within the passenger compartment 28 at a vehicle right side (front passenger's side) of the air conditioning unit 30. In this case, as shown in FIG. 5, the accumulator 35 is disposed at an outside of the air conditioning unit 30 within the passenger compartment 28. Specifically, the accumulator 35 is disposed in the low-pressure side pipe 34 at a left front side of the air conditioning unit 30 at a position near the dashboard 27.

In the third embodiment, the other parts are similar to those of the above-described first embodiment. That is, because the accumulator 35 has a small volume as described in the first embodiment, the accumulator can be readily disposed in a small space within the passenger compartment.

A fourth preferred embodiment of the present invention will be now described with reference to FIGS. 6–9. In the above-described first embodiment, the first heat-exchanging unit 21 and the second heat-exchanging unit 22 are disposed in this order in the refrigerant flow direction, and the high-pressure side gas-liquid separator 23 is provided between the first heat-exchanging unit 21 and the second heat-exchanging unit 22. Therefore, in the cooling mode, all refrigerant amount flowing into the condenser 20 flows into the receiver 23, and the super-heating degree of gas refrigerant E1 discharged from the compressor 10 and the super-heating degree of refrigerant E5 sucked into the compressor 10 are adjusted by the heat-exchanging amount H1 of the first heat-exchanging unit 21. However, outside air blown toward the condenser 20 has an air distribution. Accordingly, when a cooling load is larger in the summer season, and when the refrigerant partially greatly cooled in the first heat-exchanging unit 21, the refrigerant condensing amount in the first heat-exchanging unit 21 is increased and liquid refrigerant readily stores in the high-pressure side gas-liquid separator 23. As a result, the refrigerant amount circulating in the cycle may be decreased, and may be insufficient. In this case, the super-heating degree of refrigerant at the outlet side of the evaporator 32 is super-increased, and the super-heating degree of refrigerant discharged from the compressor 10 is also super-increased.

Thus, in the fourth embodiment, the super-heating degree of refrigerant E5 sucked into the compressor 10 is adjusted using an operation principle different from that of the above-described first embodiment. That is, in the fourth embodiment, the super-heating degree of refrigerant discharged from the compressor 10 is directly feedbacked to the high-pressure side gas-liquid separator 23, so that liquid refrigerant amount stored in the high-pressure side gas-liquid separator 23 is adjusted and the super-heating degree of refrigerant discharged from the compressor 10 can be adjusted.

Figure 6:
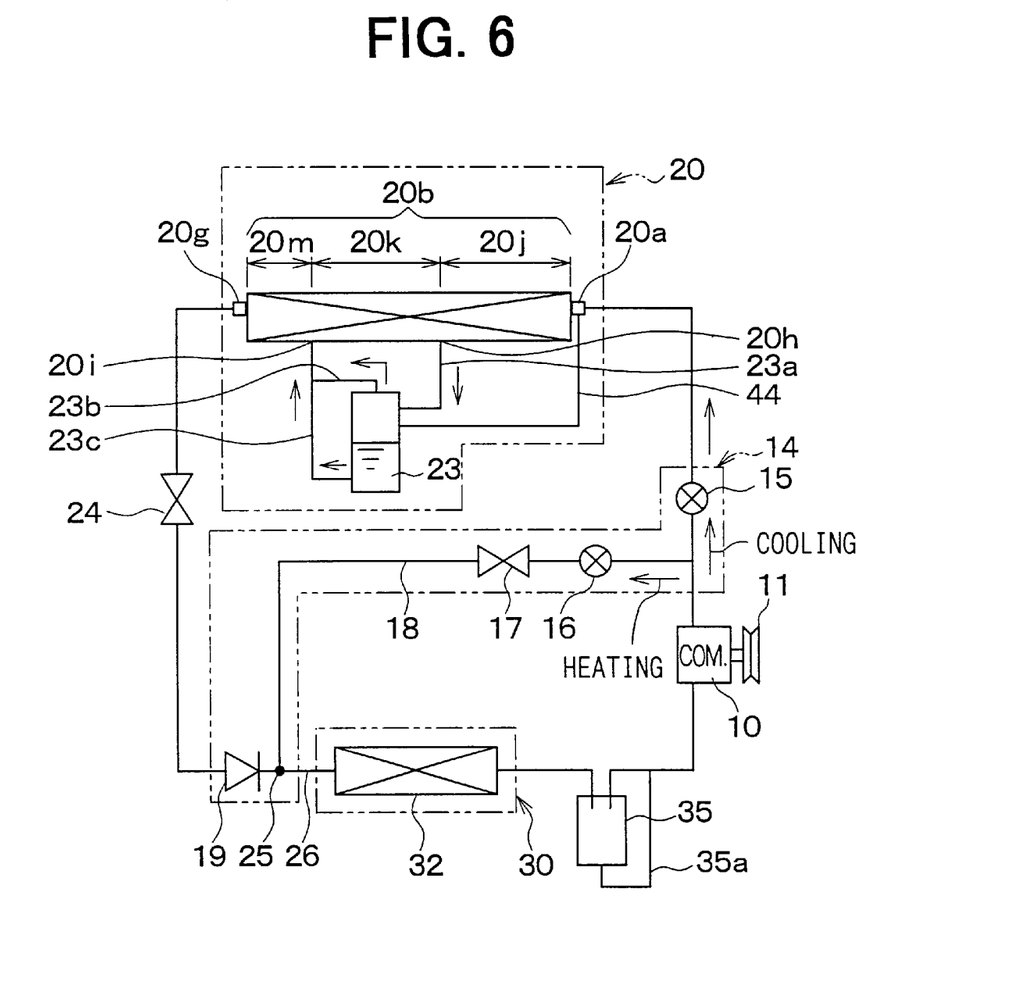
FIG. 6 is a view for explaining a cycle operation in a refrigerant cycle system according to a fourth preferred embodiment of the present invention.

As shown in FIG. 6, in the fourth embodiment, the refrigerant flow structure is changed as follows, as compared with the above-described first embodiment. A part of refrigerant in a main refrigerant passage of a condenser 20 is introduced into the upper portion within the gas-liquid separator 23 through a first communication path 23a. A connection position 20h of the first communication passage 23a is set so that gas-liquid two-phase refrigerant having a predetermined dryness in the main refrigerant passage of the condenser 20 flows into the gas-liquid separator 23. Further, a refrigerant flow amount branched into the first communication path 23a is approximate 10% relative to an entire refrigerant amount.

A second communication path 23b, through which gas refrigerant returns from the upper side within the gas-liquid separator 23 into the main refrigerant passage within the condenser 20 at a downstream side, is provided. In addition, a third communication path 23c is provided so that liquid refrigerant containing oil within the gas-liquid separator 23 returns from the lower side within the gas-liquid separator 23 returns to the main refrigerant passage within the condenser 20 at a downstream side. Specifically, both the second and third communication paths 23b, 23c are joined into a single passage, and is connected to the main refrigerant passage of the condenser 20 at a predetermined connection position 20i positioned at a downstream side than the connection position 29h by a predetermined distance. However, in the fourth embodiment, the second communication path 23b and the third communication path 23c may be connected to the main refrigerant passage of the condenser 20, respectively, without being joined together.

In the fourth embodiment, because the connection position 20i of the second and third communication paths 23b, 23c is separated from an outlet joint 20g of the condenser 20 by a predetermined distance, refrigerant and oil flowing into the main refrigerant passage of the condenser 20 from the second and third communication paths 23b, 23c can be cooled again.

Accordingly, a heat-exchanging portion 20b of the condenser 20 is partitioned into a heat-exchanging portion 20j between the inlet joint 20a and the connection position 20h of the first communication path 23a, a heat-exchanging portion 20k between the connection position 20h and the connection position 20i, and a heat-exchanging position 20m between the connection position 20i and the outlet joint 20g. In the fourth embodiment, the heat-exchanging portion 20k between the connection position 20h and the connection position 20j may be not provided, but a throttle passage may be provided between the connection position 20h and the connection position 20i in the condenser 20 so that a predetermined pressure loss is obtained between the connection position 20h and the connection position 20i in the condenser 20.

Further, in the fourth embodiment, there is provided a bypass passage 44 through which a part of super-heating gas refrigerant discharged from the condenser 10 is directly introduced into the upper side within the gas-liquid separator 23 while bypassing the main refrigerant passage of the condenser 20. The refrigerant amount branched into the bypass passage 44 is also set at approximate 10% relative to the entire refrigerant amount, similarly to the refrigerant flow amount into the first communication path 23a.

Next, operation of the refrigerant cycle system in the cooling mode according to the fourth embodiment will be now described. When a stationary state is set from a transitional state immediately after a start operation of the refrigerant cycle system, a ratio between the refrigerant amount from the first communication path 23a and the refrigerant amount from the bypass passage 44, and a ratio between the gas-refrigerant returning amount through the second communication path 23b and the liquid-refrigerant returning amount through the third communication path 23c, are suitably respectively set, so that a stable liquid refrigerant surface can be maintained within the high-pressure side gas-liquid separator 23.

Here, when refrigerant is partially cooled in the heat-exchanging portion 20j among the heat-exchanging portion 20b of the condenser 20, refrigerant condensing amount in the heat-exchanging portion 20j is increased, and the liquid refrigerant amount storing within the gas-liquid separator 23 is increased. In this case, refrigerant amount circulating in the refrigerant cycle system becomes insufficient when cooling load becomes higher in the summer, and the super-heating degree of refrigerant at the outlet of the evaporator 32 becomes higher. As a result, the super-heating degree of refrigerant discharged from the compressor 10 becomes larger, and gas refrigerant having a larger super-heating degree flows from the bypass passage 44 into the high-pressure side gas-liquid separator 23. In this case, the evaporation of liquid refrigerant within the gas-liquid separator 23 is fastened, the liquid refrigerant amount storing in the gas-liquid separator 23 is reduced, and the refrigerant amount returning from the high-pressure side gas-liquid separator 23 into the main refrigerant passage of the condenser 20 through the second communication path 23b is increased, thereby the refrigerant amount circulating in the refrigerant cycle system can be increased. As a result, the super-heating degree of refrigerant at the outlet of the evaporator 32 is reduced, and the liquid surface of liquid refrigerant within the gas-liquid separator 23 can be maintained at a stable level in the stationary state.

On the other hand, when the cooling load is small, when the super-heating degree of refrigerant at the outlet of the evaporator 32 is approximately zero or liquid refrigerant returns into the compressor 10 through the accumulator 35, the super-heating degree of refrigerant discharged from the compressor 10 also becomes smaller. In this case, the evaporation of liquid refrigerant, due to refrigerant from the bypass passage 44, within the gas-liquid separator 23 is decreased. Therefore, gas-liquid two-phase refrigerant flows into the high-pressure side gas-liquid separator 23, and the liquid refrigerant amount storing in the gas-liquid separator 23 is increased due to the refrigerant flowing from the first communication path 23a.

When the refrigerant amount circulating in the refrigerant cycle system is decreased again by the increase of the liquid refrigerant amount within the gas-liquid separator 23, the super-heating degree of refrigerant discharged from the compressor 10 is increased, and is feedbacked into the gas-liquid separator 23. Accordingly, the liquid surface level of the liquid refrigerant within the gas-liquid separator 23 can be maintained at the stable level in the stationary state.

According to the fourth embodiment, because super-heating gas refrigerant discharged from the compressor 10 can be directly introduced into the gas-liquid separator 23 through the bypass passage 44, a change of the super-heating degree of refrigerant discharged from the compressor 10 can be effectively feedbacked to an adjustment of the liquid refrigerant amount within the gas-liquid separator 23. Further, by the adjustment of liquid refrigerant within the gas-liquid separator 23, the refrigerant amount circulating in the refrigerant cycle system can be adjusted, and the super-heating degree of refrigerant discharged from the compressor 10 can be controlled. In addition, because the compression process of refrigerant in the compressor 10 is performed with an isoentropic change, the super-heating degree of refrigerant at the outlet side of the evaporator 32 can be controlled when the super-heating degree of refrigerant discharged from the compressor 10 can be controlled.

According to the fourth embodiment of the present invention, because the super-heating degree of refrigerant at the outlet side of the evaporator 32 can be adjusted by the adjustment of the liquid refrigerant amount within the gas-liquid separator 23, it can prevent the refrigerant amount circulating in the refrigerant cycle system from being insufficient. Accordingly, in the cooling mode, it can prevent the cooling capacity from being insufficient or the oil amount returning into the compressor 10 from being insufficient.

According to the fourth embodiment of the present invention, in the heating mode in the winter, refrigerant recovering operation can be effectively performed in a short time. When the outside air temperature is low in a cold time in the winter, liquid refrigerant readily stays in the condenser 20 or the gas-liquid separator 23. Therefore, when the heating operation due to the hot-gas heater is started or the heating operation due to the hot gas heater is continuously performed for a long time (e.g., 30 minutes), the cooling mode is switched at predetermined intervals for recovering refrigerant. When the cooling mode is switched for a short time (e.g., 20s) in the heating mode, refrigerant flows through the condenser 20 and the gas-liquid separator 23, refrigerant staying in the main refrigerant passage of the condenser 20 and the gas-liquid separator 23 can be recovered into a side of a hot-gas bypass cycle such as the evaporator 32, the accumulator 35, and the compressor 10.

According to the refrigerant cycle system of the fourth embodiment, in the cooling mode, a part of refrigerant discharged from the compressor 10 is branched from the main refrigerant passage of the condenser 20 and is directly introduced into the gas-liquid separator 23. In the refrigerant recovering operation during the heating mode, a main part of refrigerant discharged from the compressor 10 flows through the heat-exchanging portion 20j, the heat-exchanging portion 20k and the heat exchanging portion 20m of the condenser 20, and the decompression unit 24, without being liquefied and stored in the gas-liquid separator 23.

Therefore, in the refrigerant recovering operation during the heating mode, refrigerant can be immediately recovered.

In the fourth embodiment, even when gas-liquid separator is filled with liquid refrigerant in the heating mode, the refrigerant amount necessary for the operation of the refrigerant cycle system can be obtained by refrigerant except for the gas-liquid separator 23. That is, even when a tank volume of the gas-liquid separator 23 is subtracted from the refrigerant amount sealed in the refrigerant cycle system, the refrigerant amount necessary for the hot-gas heater operation can be obtained by the subtracted refrigerant amount. Accordingly, in the fourth embodiment, regardless of the refrigerant amount staying in the gas-liquid separator 23, the refrigerant recovering operation can be effectively performed in short time. As a result, a stop of the hot-gas heater operation, due to the refrigerant recovering operation, can be restricted in a short time, and heating capacity of the hot-gas heater can be improved.

In the fourth embodiment, as shown in FIG. 6, the gas-liquid separator 23 is disposed within the refrigerant passage of the condenser 20. That is, the condenser 20 is a separator-integrated condenser. However, the gas-liquid separator 23 may be disposed at a refrigerant outlet side of the condenser 20. Even in this case, the liquid refrigerant amount within the gas-liquid separator 23 can be adjusted by directly introducing the super-heating gas refrigerant discharged from the compressor 10.

Figure 7:
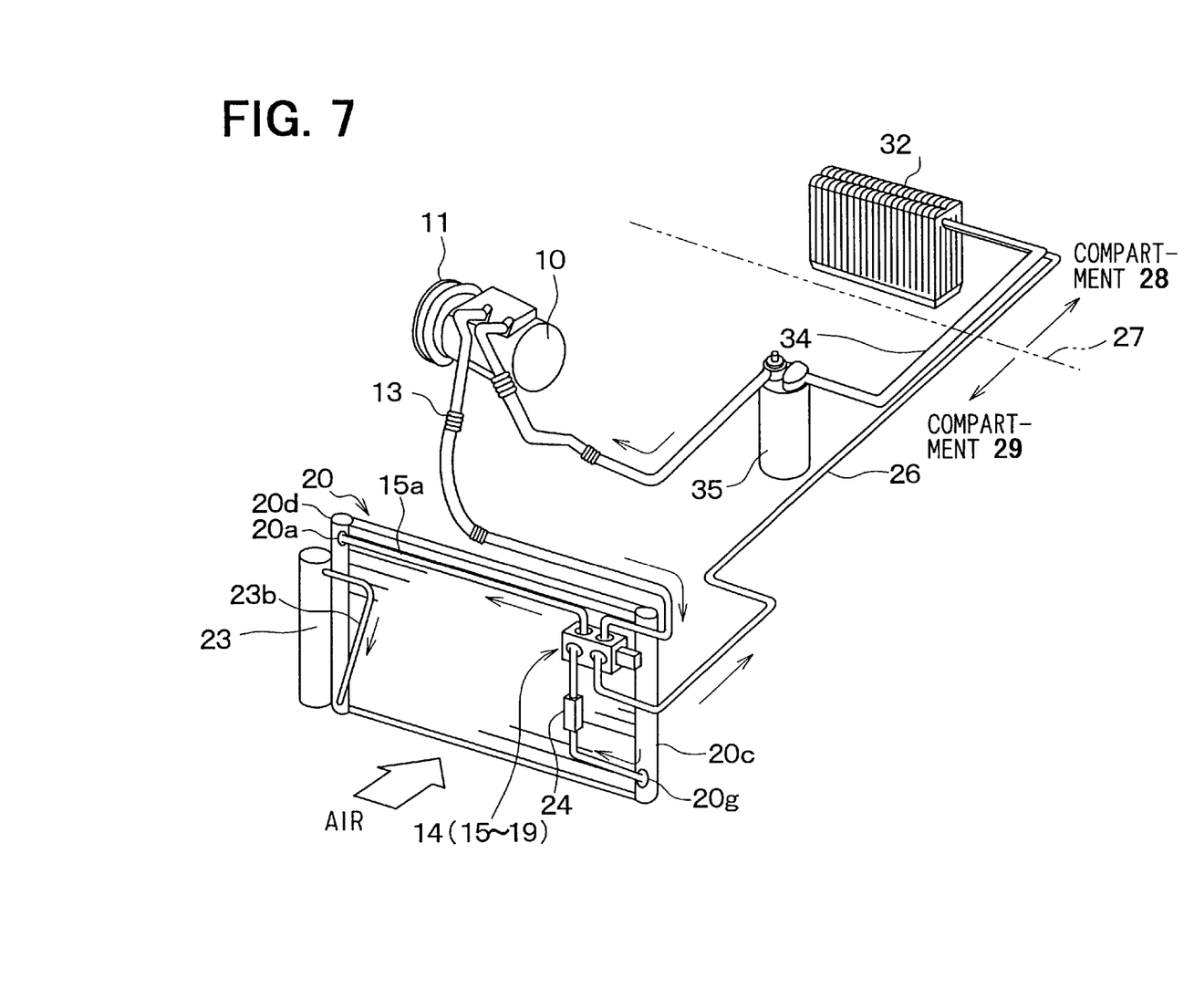
FIG. 7 is a schematic perspective view showing a mounting state of the refrigerant cycle system on a vehicle, according to the fourth embodiment.
Figure 8:
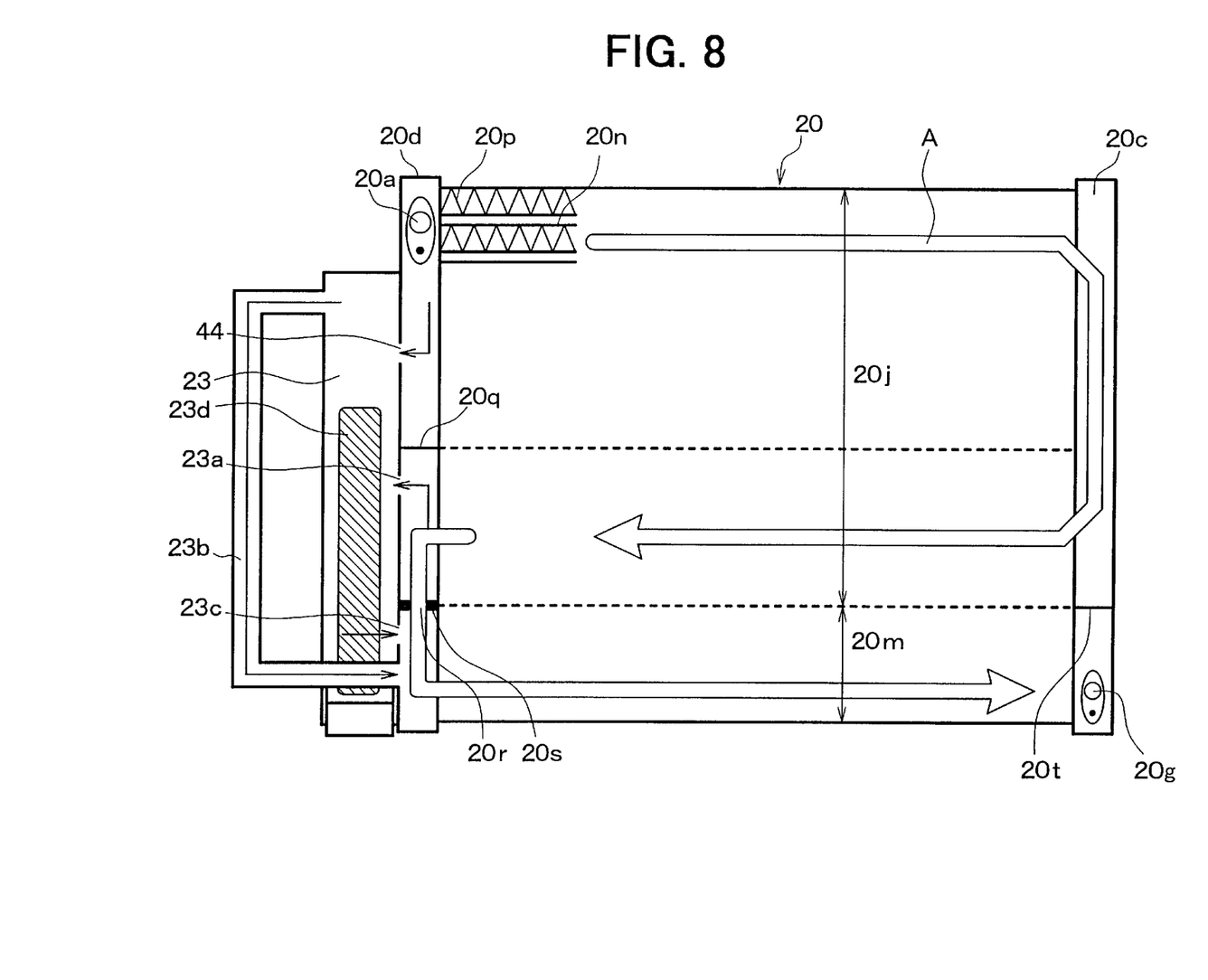
FIG. 8 is a schematic view for explaining a refrigerant flow in a separator-integrated condenser according to the fourth embodiment.

FIG. 7 shows a mounting state of the refrigerant cycle system according to the fourth embodiment on a vehicle. In FIG. 7, components similar to those of the above-described first embodiment are indicated by the same reference numbers, and detain explanation thereof is omitted. In FIG. 7, the refrigerant passage structure of the condenser 20 integrated with the gas-liquid separator 23 is mainly different from that of the above-described first embodiment. FIG. 8 shows an example of the refrigerant passage structure of the condenser 20 of the fourth embodiment. As shown in FIG. 8, the condenser 20 includes plural flat tubes 20n extending horizontally and plural corrugated fins 20p each of which is disposed between adjacent the flat tubes 20n. The flat tubes 20n and the corrugated fins 20p are disposed between both header tanks 20c, 20d to form heat-exchanging portions 20j, 20m. In FIG. 8, the heat-exchanging portion 20k indicated in FIG. 6 is omitted.

In the above-described first embodiment shown in FIG. 1, both the inlet joint 20a and the outlet joint 20g are provided at the one heater tank 20c, and the gas-liquid separator 23 is integrated with the other header tank 20d. However, as shown in FIG. 8, in the fourth embodiment, the outlet joint 20g is provided in the one header tank 20c, and the gas-liquid separator 23 and the inlet joint 20a are provided in the other header tank 20d. Further, as shown in FIG. 8, a partition plate 20q is disposed within the header tank 20d having the inlet joint 20a at a middle height position, and a plate member 20s having a throttle 20r is disposed within this header tank 20d at a lower side position. On the other hand, a partition plate 20t is disposed within the header tank 20c having the outlet joint 20g at the same height position as that of the partition member 20s. Refrigerant discharged from the compressor 10 flows from the inlet joint 20a into the upper space within the header tank 20d upper than the partition plate 20q, and the upper space upper than the partition plate 20q within the header tank 20d directly communicates with an upper space within the gas-liquid separator 23 through the bypass passage 44.

The heat-exchanging portion 20j is formed at an upper side upper than the plate member 20s and the partition plate 20t, and the heat-exchanging portion 20m is formed at a lower side lower than the plate member 20s and the partition plate 20t. The middle heat-exchanging portion 20k shown in FIG. 6 is omitted in FIG. 8.

A part of refrigerant discharged from the compressor 10 flowing into the upper space upper than the partition plate 20q within the header tank 20d directly flows into the upper space within the gas-liquid separator 23 through the bypass passage 44. On the other hand, a main part of refrigerant discharged from the compressor 10 flows through the heat-exchanging portion 20j and is U-turned as shown by arrow A in FIG. 8, to be cooled and condensed. Therefore, refrigerant after passing through the heat-exchanging portion 20j is in a gas-liquid two-phase state having a general dryness. Refrigerant from the heat-exchanging portion 20j flows into a middle space of the header tank 20d between the partition plate 20q and the plate member 20s having the throttle 20r, and a main part of the refrigerant in this middle space flows into the lowest space within the header tank 20d through the throttle 20r. Simultaneously, a part of the refrigerant in this middle space within the header tank 20d flows into the gas-liquid separator 23 from the first communication path 23a.

Further, liquid refrigerant containing oil flows from a lower position within the gas-liquid separator 23 into the lowest space within the header tank 20d through the third communication path 23c. Because the throttle 20r is provided in the plate member 20s defining the middle space and the lowest space, a predetermined pressure difference can be set due to the pressure loss in the throttle 20r. Thus, a part refrigerant can be accurately introduced from the middle space within the header tank 20d into the gas-liquid separator 23 through the first communication path 23a, and oil contained in liquid refrigerant within the gas-liquid separator 23 can be accurately introduced into the lowest space of the header tank 20d through the third communication path 23c.

In FIG. 8, each of the bypass passage 44, the first communication path 23a and the third communication path 23c can be simply formed by a penetrating hole penetrating through a wall surface between the header tank 20d and the gas-liquid separator 23. Thus, in this case, an additional pipe structure is unnecessary for the bypass passage 44, the first communication path 23a and the third communication path 23c.

On the other hand, the second communication path 23b is constructed by a pipe member through which gas refrigerant at the upper side within the gas-liquid separator 23 is introduced into the lowest space within the header tank 20d. The pipe member for forming the second communication path 23b is integrated brazed to the condenser 20 to be simultaneously bonded to the gas-liquid separator 23 and the header tank 20d. Refrigerant flowing into the lowest space within the header tank 23d flows through the heat-exchanging portion 20m to be cooled and condensed, and flows into the lowest portion within the header tank 20c under the partition plate 20t. Thereafter, refrigerant flows toward the decompression unit 24 from the outlet joint 20g. In the fourth embodiment, a desiccant 23d for dehydrating refrigerant is disposed within the gas-liquid separator 23.

In the fourth embodiment, the other parts are similar to those of the above described first embodiment. For example, the high-pressure side gas-liquid separator 23 is disposed integrally in the condenser 20, while the low-pressure side accumulator 35 is disposed between the refrigerant outlet side of the evaporator 32 and the refrigerant suction side of the compressor 10.

Although the present invention has been fully described in connection with the preferred embodiments thereof with reference to the accompanying drawings, it is to be noted that various changes and modifications will become apparent to those skilled in the art.

For example, in the above-described embodiments, both the electromagnetic valves 15 and 16 are used to switch the cooling mode or the heating mode. However, a three-way type electromagnetic switching valve may be used instead of both the electromagnetic valves 15, 16. Alternatively, among both the electromagnetic valves 15, 16, the valve 15 for cooling may be an electromagnetic valve, and the valve 16 for heating may be a pressure-difference valve (differential pressure regulating valve) which is opened by a pressure difference between a refrigerant pressure discharged from the compressor 10 and a refrigerant pressure at the side of the condenser 20, generated when the electromagnetic valve 15 is closed.

In the above-described embodiments, the capillary tube is used as the fixed throttle constructing the decompression unit 24. However, the other fixed throttle such as a nozzle and an orifice may be used as the fixed throttle constructing the decompression unit 24. In this case, because a passage length of the fixed throttle such as the nozzle and the orifice is greatly reduced as compared with the capillary tube, the decompression unit 24 can be integrated into the valve device 14.

When the accumulator 35 is disposed within the passenger compartment 28 as described in the third embodiment, the accumulator 35 may be integrated with an inner surface of a case of the air conditioning unit 30 or may be integrated with an outer surface of the case of the air conditioning unit 30.

In the condenser 20 of the first embodiment, the first heat-exchanging unit 21, the second heat-exchanging unit 22 and the gas-liquid separator 23 may be integrally connected using a suitable pipe and the like, after being formed respectively separately. Similarly, in the condenser 20 of the second embodiment, the header tank of the condenser 20 and the gas-liquid separator 23 may be integrally connected using a suitable pipe and the like, after being formed respectively separately.

The decompression unit 24 can be constructed by a movable throttle. That is, if the decompression unit 24 is a variable throttle operated in accordance with a refrigerant state (e.g., temperature, pressure) at an upstream side of the decompression unit 24, the decompression unit 24 can be disposed around the condenser 20, similarly to a case where the decompression unit is constructed by the fixed throttle. In this case, the hot-gas bypass passage 18 can be constructed by a very short passage.

In the above-described embodiments, the check valve 19 is disposed at the downstream side of the decompression unit 24. However, the check valve 19 may be disposed between an upstream side of the decompression unit 24 and the outlet joint 20g of the condenser 20.

In the above-described embodiments, the throttle passage 35a for returning oil into the compressor 10 is provided so that oil contained in liquid refrigerant is introduced to an outside from the bottom portion of the accumulator 35, as shown in FIGS. 2 and 6. However, a throttle passage for returning oil may be integrally formed in a tank portion of the accumulator 35 to be integrated with the gas-returning pipe through which gas refrigerant is introduced from the accumulator 35 into the compressor 10.

Such changes and modifications are to be understood as being within the scope of the present invention as defined by the appended claims.

What is claimed is:

1. A refrigerant cycle system comprising:

a compressor for compressing and discharging refrigerant;

a condenser for condensing refrigerant discharged from the compressor in a cooling mode;

a heat exchanger for cooling air in the cooling mode and for heating air in a heating mode;

a first gas-liquid separator, disposed between a refrigerant outlet side of the heat exchanger and a refrigerant suction side of the compressor, for separating refrigerant into gas refrigerant and liquid refrigerant and for introducing gas refrigerant into the compressor; and a switching unit for selectively switching one of the cooling mode for cooling air in the heat exchanger by an evaporation of refrigerant, and the heating mode in which gas refrigerant discharged from the compressor is directly introduced into the heat exchanger to heat air, wherein:

the first gas-liquid separator has a throttle passage for introducing a part of liquid refrigerant stored in the gas-liquid separator into the compressor; and the condenser includes both first and second heat-exchanging units which are disposed in this order in a refrigerant flow direction, and a second gas-liquid separator disposed between the first heat-exchanging unit and the second heat-exchanging unit for separating refrigerant into gas refrigerant and liquid refrigerant, wherein the second gas-liquid separator is disposed to discharge at least the separated gas refrigerant from the second gas-liquid separator.

2. The refrigerant cycle system according to claim 1, further comprising:

a first decompression unit for decompressing refrigerant from the condenser, the first decompression unit being disposed at an upstream side of the heat exchanger in the refrigerant flow direction in the cooling mode;

a hot-gas bypass passage through which gas refrigerant discharged from the compressor is introduced into the heat exchanger while bypassing the condenser; and a second decompression unit, disposed in the hot-gas bypass passage, for decompressing refrigerant discharged from the compressor, wherein the switching unit is a valve member for switching a refrigerant flow from the compressor toward the condenser in the cooling mode, and a refrigerant flow from the compressor toward the hot-gas bypass passage in the heating mode.

3. The refrigerant cycle system according to claim 1, wherein:

the first heat-exchanging unit is disposed to cool and condense refrigerant discharged from the compressor;

the second gas-liquid separator is disposed, for separating refrigerant from the first heat-exchanging unit into gas refrigerant and liquid refrigerant, and for introducing separated gas refrigerant into the second heat-exchanging unit;

the second heat-exchanging unit is disposed for condensing gas refrigerant from the second gas-liquid separator; and a super-heating degree of refrigerant at a refrigerant outlet of the heat exchanger is controlled by a heat-exchanging amount in the first heat-exchanging unit.

4. The refrigerant cycle system according to claim 1, wherein:

the first heat-exchanging unit and the second heat-exchanging unit are integrally constructed as an integrated member; and the second gas-liquid separator is constructed integrally with both the first and second heat-exchanging units.

5. The refrigerant cycle system according to claim 1, wherein the second gas-liquid separator is constructed separately from the first and second heat-exchanging units at a position proximate to the first and second heat-exchanging units.

6. The refrigerant cycle system according to claim 2, wherein:

the first decompression unit is disposed at a position proximate to the condenser;

a refrigerant outlet side of the first decompression unit and a refrigerant outlet side of the hot-gas bypass passage are joined to a single refrigerant pipe through which refrigerant decompressed in at least one of the first and second decompression units flows, at a position proximate to the condenser; and the single refrigerant pipe is connected to a refrigerant inlet side of the heat exchanger.

7. The refrigerant cycle system according to claim 2, wherein the first decompression unit is a fixed throttle.

8. The refrigerant cycle system according to claim 2, further comprising a check valve disposed to prevent a refrigerant flow from the hot-gas bypass passage into the condenser, wherein the bypass passage, the second decompression unit, the switching unit and the check valve are integrally constructed to form a single valve device.

9. The refrigerant cycle system according to claim 1, wherein:

the refrigerant outlet side of the heat exchanger and the refrigerant suction side of the compressor are connected by a refrigerant pipe; and the first gas-liquid separator is disposed to be supported in the refrigerant pipe.

10. The refrigerant cycle system according to claim 1, wherein:

the heat exchanger is disposed for cooling or heating air blown into a passenger compartment of a vehicle; and the first gas-liquid separator is disposed within the passenger compartment.

11. The refrigerant cycle system according to claim 10, wherein:

the heat exchanger is disposed in an air conditioning case defining an air passage through which air flows into the passenger compartment; and the first gas-liquid separator is disposed in the air conditioning case.

12. The refrigerant cycle system according to claim 10, wherein:

the heat exchanger is disposed in an air conditioning case defining an air passage through which air flows into the passenger compartment; and the first gas-liquid separator is disposed at an outside of the air conditioning case, within the passenger compartment.

13. A refrigerant cycle system comprising:

a compressor for compressing and discharging refrigerant;

a condenser for condensing refrigerant discharged from the compressor in a cooling mode, the condenser defining a main refrigerant passage through which refrigerant flows while being cooled and condensed;

a heat exchanger for cooling air in the cooling mode and for heating air in a heating mode;

a first gas-liquid separator, disposed between a refrigerant outlet side of the heat exchanger and a refrigerant suction side of the compressor, for separating refrigerant into gas refrigerant and liquid refrigerant and for introducing gas refrigerant into the compressor;

a second gas-liquid separator for separating refrigerant into gas refrigerant and liquid refrigerant, the second gas-liquid separator being disposed in a branched refrigerant passage branched from the main refrigerant passage of the condenser; and a switching unit for selectively switching one of the cooling mode for cooling air in the heat exchanger by an evaporation of refrigerant, and the heating mode in which gas refrigerant discharged from the compressor is directly introduced into the heat exchanger to heat air, wherein:

the first gas-liquid separator has a throttle passage for introducing a part of liquid refrigerant stored in the gas-liquid separator into the compressor; and the second gas-liquid separator is disposed in such a manner that a liquid refrigerant amount stored in the second gas-liquid separator is adjusted in accordance with a super-heating degree of gas refrigerant discharged from the compressor.

14. The refrigerant cycle system according to claim 13, wherein the second gas-liquid separator is integrally constructed with the condenser.

15. The refrigerant cycle system according-to claim 13, further comprising a refrigerant-introducing passage through which a part of gas refrigerant discharged from the compressor is directly introduced into the second gas-liquid separator.

16. The refrigerant cycle system according to claim 13, further comprising a refrigerant-returning passage through which gas refrigerant separated in the second gas-liquid separator returns to the main refrigerant passage of the condenser.

17. The refrigerant cycle system according to claim 13, further comprising an oil returning passage through which liquid refrigerant containing oil returns to the main refrigerant passage of the condenser from a lower side within the second gas-liquid separator.

18. The refrigerant cycle system according to claim 13, further comprising:

a hot-gas bypass passage through which gas refrigerant discharged from the compressor is introduced into a refrigerant inlet of the heat exchanger in the heating mode;

a first decompression unit for decompressing refrigerant from the condenser in the cooling mode, the first decompression unit being disposed at an upstream side of the heat exchanger in the refrigerant flow direction in the cooling mode; and a second decompression unit, disposed in the hot-gas bypass passage, for decompressing refrigerant discharged from the compressor in the heating mode, wherein the switching unit is a valve member for switching a refrigerant flow from the compressor toward the condenser in the cooling mode, and a refrigerant flow from the compressor toward the hot-gas bypass passage in the heating mode.

19. The refrigerant cycle system according to claim 18, wherein:

the first decompression unit is disposed at a position proximate to the condenser;

a refrigerant outlet side of the first decompression unit and a refrigerant outlet side of the hot-gas bypass passage are joined to a single refrigerant pipe through which refrigerant decompressed in at least one of the first and second decompression units flows, at a position proximate to the condenser; and the single refrigerant pipe is connected to a refrigerant inlet side of the heat exchanger.

20. The refrigerant cycle system according to claim 18, wherein the decompression unit is a fixed throttle.

21. The refrigerant cycle system according to claim 18, further comprising a check valve disposed to prevent a refrigerant flow from the hot-gas bypass passage into the condenser, wherein the bypass passage, the second decompression unit, the switching unit and the check valve are integrally constructed to form a single valve device.

22. The refrigerant cycle system according to claim 13, wherein:

the refrigerant outlet side of the heat exchanger and the refrigerant suction side of the compressor are connected by a refrigerant pipe; and the first gas-liquid separator is disposed to be supported in the refrigerant pipe.

23. The refrigerant cycle system according to claim 13, wherein:

the heat exchanger is disposed for cooling or heating air blown into a passenger compartment of a vehicle; and the first gas-liquid separator is disposed within the passenger compartment.

24. The refrigerant cycle system according to claim 23, wherein:

the heat exchanger is disposed in an air conditioning case defining an air passage through which air flows into the passenger compartment; and the first gas-liquid separator is disposed in the air conditioning case.

25. The refrigerant cycle system according to claim 23, wherein:

the heat exchanger is disposed in an air conditioning case defining an air passage through which air flows into the passenger compartment; and the first gas-liquid separator is disposed at an outside of the air conditioning case, within the passenger compartment.

* * * * *